US006853508B2

United States Patent
Smith et al.

(10) Patent No.: US 6,853,508 B2
(45) Date of Patent: Feb. 8, 2005

(54) IN-SITU DETECTION OF CONTAMINANT ACCUMULATION ON A SLIDER IN A DISK DRIVE

(75) Inventors: Gordon James Smith, deceased, late of Rochester, MN (US); by Molly Smith, legal representative, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 436 days.

(21) Appl. No.: 10/132,339

(22) Filed: Apr. 25, 2002

(65) Prior Publication Data

US 2003/0202273 A1 Oct. 30, 2003

(51) Int. Cl.$^7$ .......................... G11B 27/36; G11B 21/02
(52) U.S. Cl. .......................... 360/31; 360/75; 324/210
(58) Field of Search .......................... 360/31, 25, 75, 360/69, 53; 324/210, 211, 212; 73/9, 105

(56) References Cited

U.S. PATENT DOCUMENTS

2002/0097513 A1 * 7/2002 Ng et al. .................... 360/31

OTHER PUBLICATIONS

IBM Technical Disclosure Bulletin, "Thermal Heating of Slider Trailing Edge to Remove Contamination", G. J. Smith, vol. 40 No. 7 Jul. 1997.

* cited by examiner

*Primary Examiner*—Andrew L. Sniezek
(74) *Attorney, Agent, or Firm*—Bracewell & Patterson, LLP

(57) ABSTRACT

The present invention provides a method and apparatus for detecting the presence of contaminants on the slider of a disk drive. By detecting the rate of change of the resistance of a thin film coil of a disk drive write element during drive operation, it can be determined if a foreign material is present on the coil. Nominal resistance change values for write elements of a disk drive are determined at manufacturing time, and are stored within the disk drive. During later operational use, the resistance change for the coil of the write elements is measured and compared with the stored nominal resistance change values. If the difference between the stored nominal resistance values and the measured resistance change values exceeds a predetermined threshold, the drive is presumed to have contaminants on the slider.

21 Claims, 8 Drawing Sheets

IN-SITU DETECTION OF CONTAMINANT ACCUMULATION ON A SLIDER IN A DISK DRIVE

FIELD OF THE INVENTION

The present invention relates generally to disk drive systems, and more specifically to an apparatus and method for detecting contaminants on a slider in a disk drive.

BACKGROUND OF THE INVENTION

Within the data storage system manufacturing industry, much attention is presently being focused on reducing head-to-disk clearance (i.e., flying height) as part of the effort to increase the storage capacity of data storage disks. It is generally desirable to reduce the head-to-disk clearance in order to increase the readback signal sensitivity of the transducer to typically weaker magnetic transitions associated with the higher recording density written on disks.

As the flying height of the head decreases, the slider assembly containing the head interacts much more frequently with the disk surface. As a result, the slider can accumulate a variety of contaminants as it passes in proximity to the surface of the disk. One phenomenon that has been recently discovered in the "Jami" problem, where contaminants (e.g., lubricants) are accumulated on the air-bearing slider structure during normal operations, and subsequently dropped on the surface of the disk.

In most instances, these droplets of lubricant spread back onto the surface of the disk or are sheared off by air shear or the slider. However, in some instances, the head may be performing a write operation at the same time the slider encounters a lubricant droplet protruding from the surface of the disk. In this instance, a significant vertical excursion of the slider takes place, and the signal is not properly written to the surface of the disk. More specifically, the data is written with the head at an abnormally large head-disk spacing which causes incomplete overwrite of old data and results in a hard read error. Another deleterious type of Jami is the so-called "Dango Jami" which involves excitation of the airbearing slider at a resonance frequency. The resulting flying height modulation results in poor writing when the slider flying height is high.

As a result of the foregoing problems, there exists a need for an apparatus and method for performing in-situ detection of lubricant or other foreign material build-up on the trailing edge of a disk drive slider.

SUMMARY OF THE INVENTION

The present invention provides a method and apparatus for detecting the presence of contaminants on the slider of a disk drive. By detecting the rate of change of the resistance of a thin film coil of a disk drive write element during drive operation, it can be determined if a foreign material is present on the coil.

The present invention provides an apparatus including a data store for storing nominal resistance values of a write element of the disk drive at manufacturing time. The apparatus also provides a coil associated with the write element, the coil positioned on the slider of the disk drive for measuring resistance change of the write element during disk drive operation. The apparatus further provides a comparator for comparing the stored nominal resistance values against the resistance change measurements performed during disk drive operation. If the comparator results exceed a predetermined threshold, the slider of the disk drive is presumed to have at least some accumulation of contaminants.

In one embodiment, the data store includes transient resistance and/or direct current (DC) resistance. In a preferred embodiment of the present invention, the data store is a reserved area on the surface of a disk drive. In an alternate embodiment, the data store is a memory component present within the disk drive. In a preferred embodiment of the present invention, the thin film coil is a planarized electrical structure, having a DC resistance of approximately 12 ohms.

The measurement of the resistance of the coil may occur when the write element is unloaded on the load/unload ramp of the disk drive, or alternatively while the write element of the disk drive is flying over areas of the disk drive surface that do not contain customer data. The measurement of the resistance of the coil is initiated either periodically during operation of the disk drive, or alternatively if the number of read/write errors detected during operation of the disk drive exceeds a predetermined threshold.

As mentioned earlier, the present invention also provides a method for detecting contaminant accumulation on a slider of a disk drive. As a first step, nominal resistance change values for write elements of a disk drive are determined at manufacturing time, and are stored within the disk drive. During later operational use, the resistance change for the coil of the write elements is measured and compared with the stored nominal resistance change values. If the difference between the stored nominal resistance values and the measured resistance change values exceeds a predetermined threshold, the drive is presumed to have contaminants on the slider. If the drive is presumed to have contaminants on the slider, the contaminants may be removed. In a preferred embodiment, the contaminants are volatized by applying a steady DC current to the coil.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1:
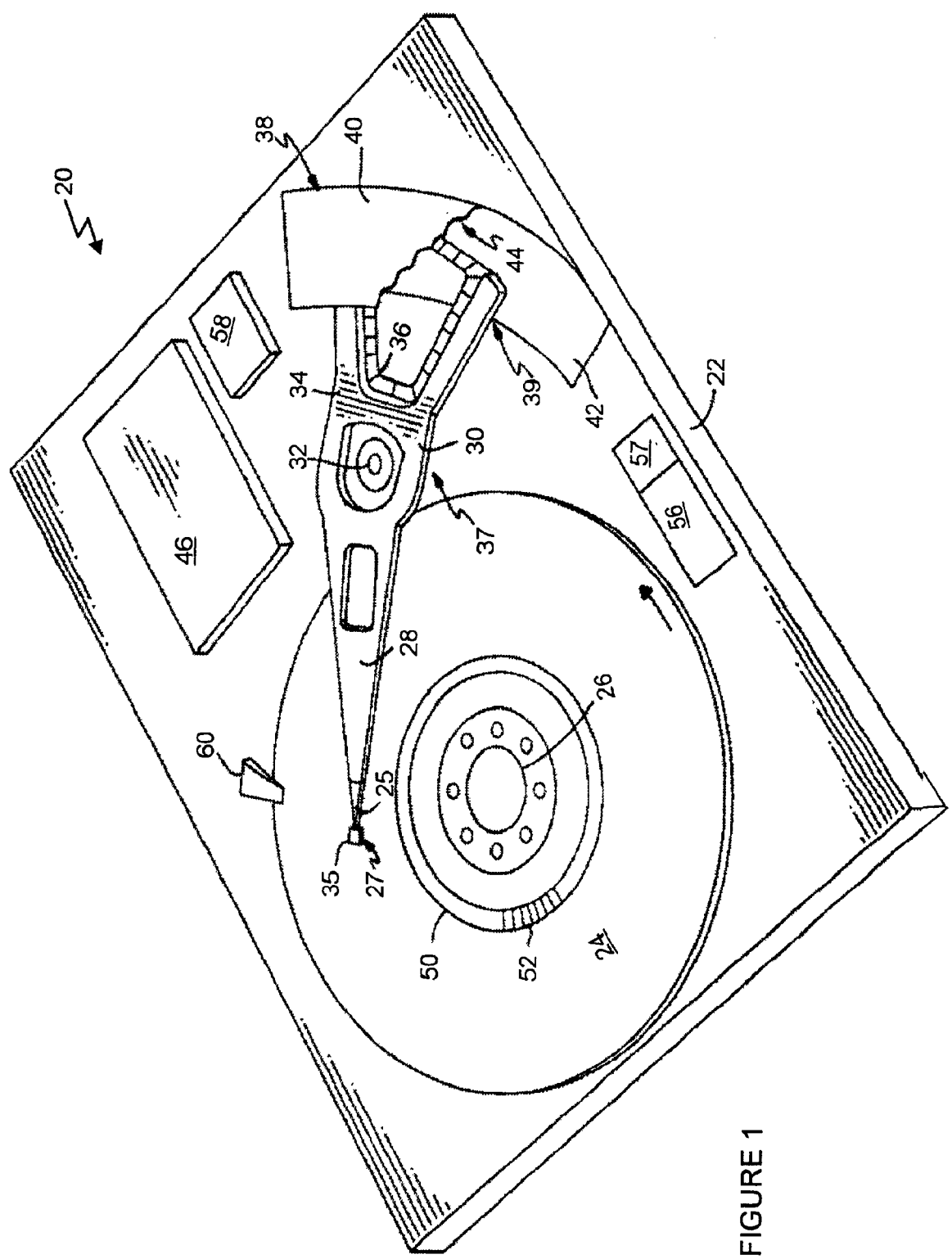
FIG. 1 is a top perspective view of a disk drive system with its upper housing cover removed.
Figure 2:
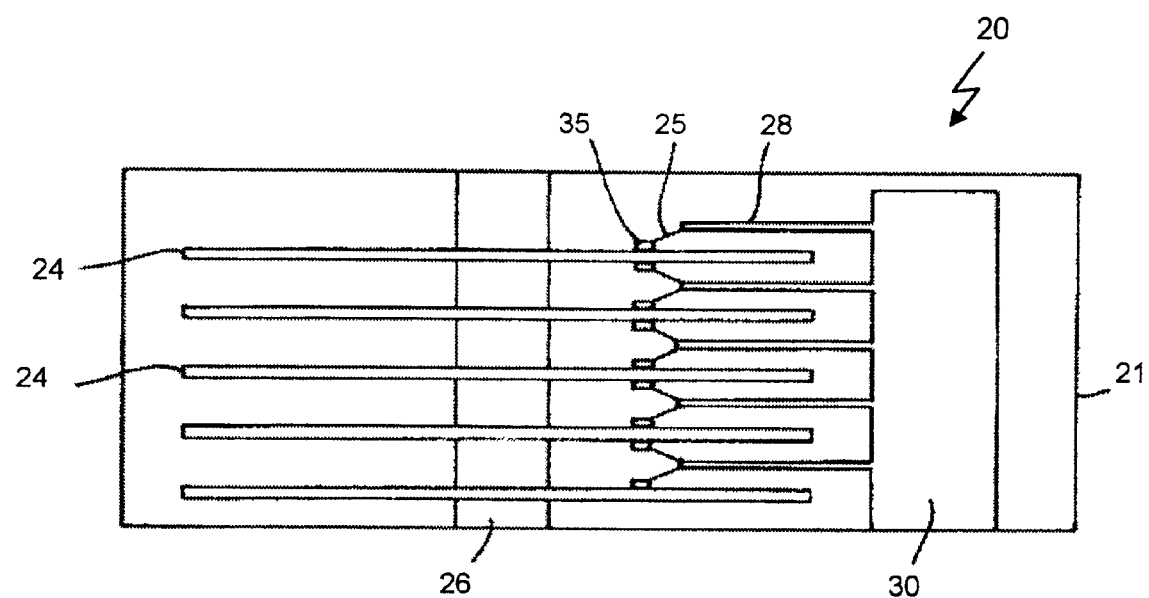
FIG. 2 is a side plan view of a disk drive system comprising a plurality of data storage disks.

Turning to the Drawings, wherein like numbers denote like parts throughout the several views, FIGS. 1 and 2 illustrate a data storage system 20 within which the apparatus and method for in-situ detection of contaminants on a slider is found. This disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, which each sector 52 comprising a number of information fields, including fields for storing data, and sector identification and synchronization information, for example.

Writing data to a magnetic data storage disk 24 generally involves passing a current through an inductive coil in the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks. The slider 35 is typically designed as an aerodynamic lifting body that lifts the transducer 27 off the surface as the rate of spindle motor rotation increases and causes the transducer 27 to hover above the disk 24 on an airbearing produced by high speed rotation of the disk. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 which controls currents of varying direction and magnitude flowing in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The present invention solves the problem of contamination detection on the trailing edge of a head by monitoring the heat loss from an inductive write element. When contamination is present, it becomes an insulating layer that restricts heat loss from the coil associated with the thin film write element. The temperature of the thin film coil can be determined by measuring its resistance which is a function of temperature. The thin film coil temperature can also be estimated by monitoring the resistance of the GMR element which is in close proximity to the write element. The restricted heat loss will cause an increase in the internal resistance of the coil for a given DC write current.

Another measurement that can be made is a transient type. The resistance of the thin film coil is measured between electrical current pulses, for example. By detecting the rate of change of the coil's resistance, it can be determined if a foreign material is present on the coil. For example, due to the mass and specific heat of the contamination, the rate of change of temperature will be slower than if no contamination was present. The measurement can be performed while the heads are unloaded on the load/unload ramp of while the heads are flying (if they are positioned in an area where customer data will not be destroyed).

Figure 3:
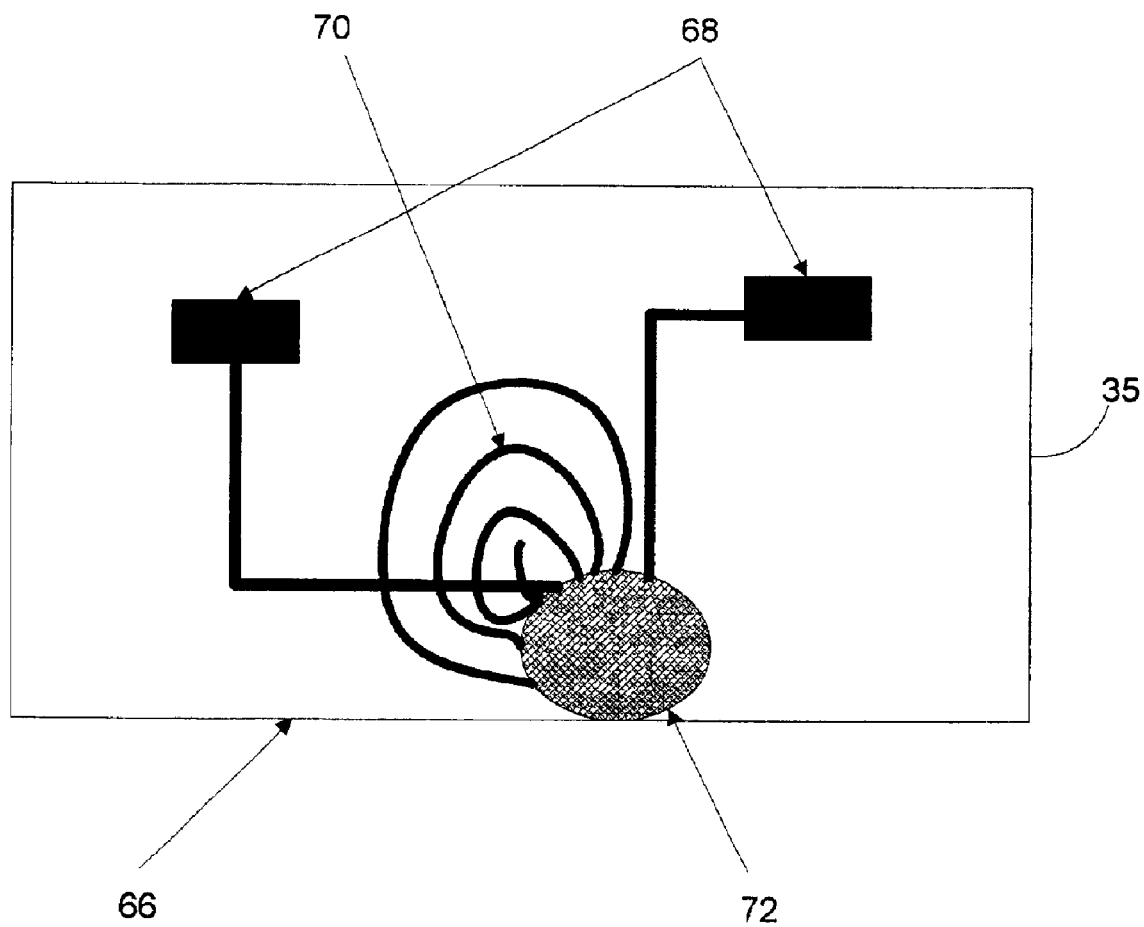
FIG. 3 is a rear view of a slider trailing edge showing a thin film coil with a drop of liquid lubricant partially covering the coil.

FIG. 3 illustrates the trailing edge of a slider 35, having an airbearing surface 66 and connection pads 68. A inductive coil 70 for the thin film write element is shown as positioned on the back of slider 35. In the illustration, a drop of liquid lubricant 72 partially covers coil 70. In a preferred embodiment, coil 70 is a planarized electrical structure that typically has a DC resistance of roughly 12 ohms. When an electrical current is passed through coil 70 during normal operation, its temperature rises due to Joule heating. Like most metals, the resistance of the thin film coil 70 increases with temperature and therefore its resistance can be used to monitor the temperature of the coil.

Figure 4:
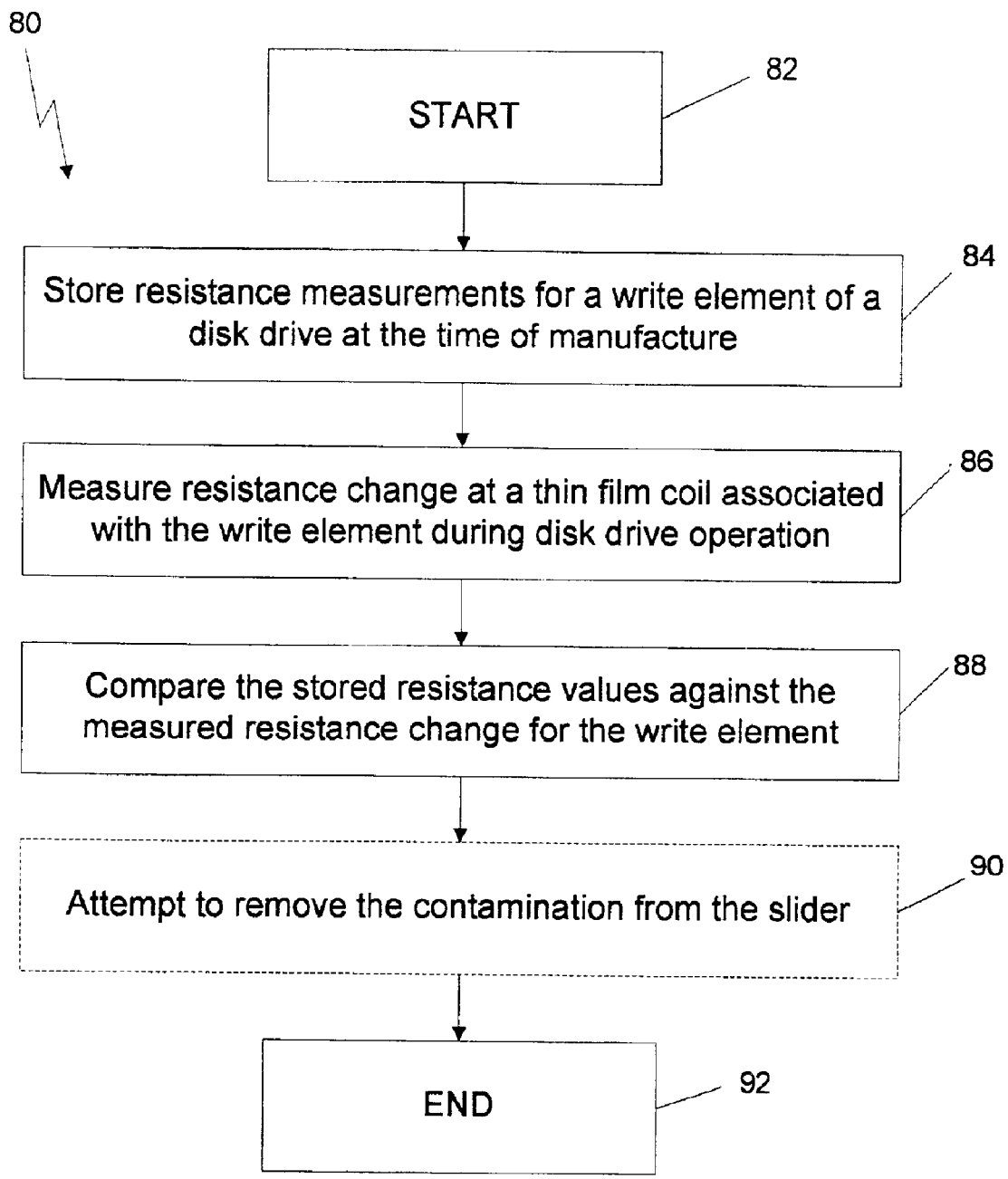
FIG. 4 is a flowchart of a method for detecting contaminant accumulation on a slider in a disk drive.

FIG. 4 illustrates a method for detecting contaminant accumulation on a slider in a disk drive, the method shown generally at 80. The method begins at block 82. In order to implement the invention, the DC and/or transient resistance of each write element (i.e., one per head) is determined at drive manufacturing time, as shown at block 84. These values are saved on the drive (typically in the reserved area on each disk surface). In an alternative embodiment, these value may be saved to memory within the disk drive.

Periodically, over the lifetime of the drive, or alternatively if certain read or write errors frequently occur, the thin film resistance change due to internal heating is measured, as shown at block 86.

These measurements are then compared against the resistance values saved at the time of manufacture by a comparator (e.g., functional logic built in to the hard disk drive controller or other in-situ microprocessor), as shown at block 88. If a significant change is noted, this indicates that liquid or possibly solid/liquid accumulation is present.

With this knowledge, attempts can be made to remove this contamination, or recommend replacing the drive, or used some pattern of load/unload and/or head seek profile to alleviate the condition, as shown at block 90. Also, a steady DC current can be applied while the head is on the ramp in an attempt to volatilize any liquid. This method terminates at block 92.

Figure 5:
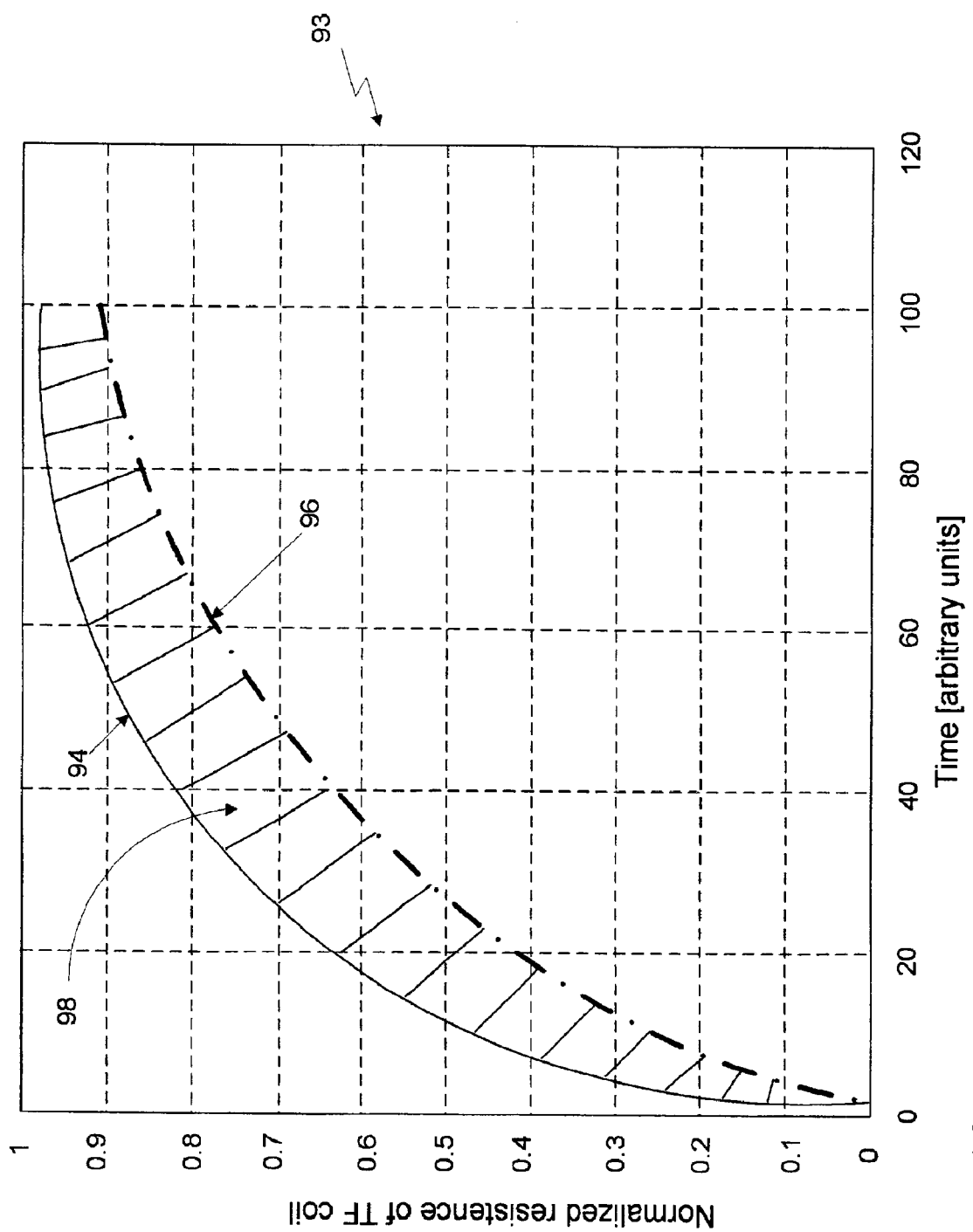
FIG. 5 is a graph illustrating a hypothetical comparison of transient response for a clean trailing edge coil versus a contaminated trailing edge coil.

FIG. 5 is a graph illustrating hypothetical transient responses of thin film coil resistance for two cases, shown generally at 93. These curves are generated by using a short current pulse (10's of milliseconds) generated through the coil followed by a resistance measurement using a much lower current (<10 milliseconds). In fact, either a DC, AC, or transient DC current can be used while monitoring the voltage drop across the coil and thereby gaining a measure of the coil's resistance.

In the first case, shown at 94, the trailing edge of the slider is clean and cooling results from the convention and conduction to the air (i.e., the head is assumed unloaded). In the second case, shown at 96, a drop of lubricant is attached to the trailing edge of the slider. Due to the specific heat of the liquid, the transient response of the coil resistance is slower than when no liquid is present. This difference is shown by the region 98.

An experiment was performed in order to verify the curves illustrated in FIG. 5. A scrap slider containing an MR head and thin file (TF) write element were found. A fixed DC current was passed through the TF write element coil while the NR element resistance was measured. The temperature rise of the MR element was estimated using a temperature coefficient of resistance of 1.3E-3 for the MR material. The trailing edge of the slider was tested under two conditions. In the first, the slider trailing edge was dry and in the second case, a small amount of Fomblin® Z-dol 4000 lubricant, from Asimont was applied to the center of the trailing edge by using a fine steel wire. For both cases, the MR resistance was measured by using a small MR bias current of approximately 1E-3 amps and measuring the voltage drop across the MR element.

Figure 6:
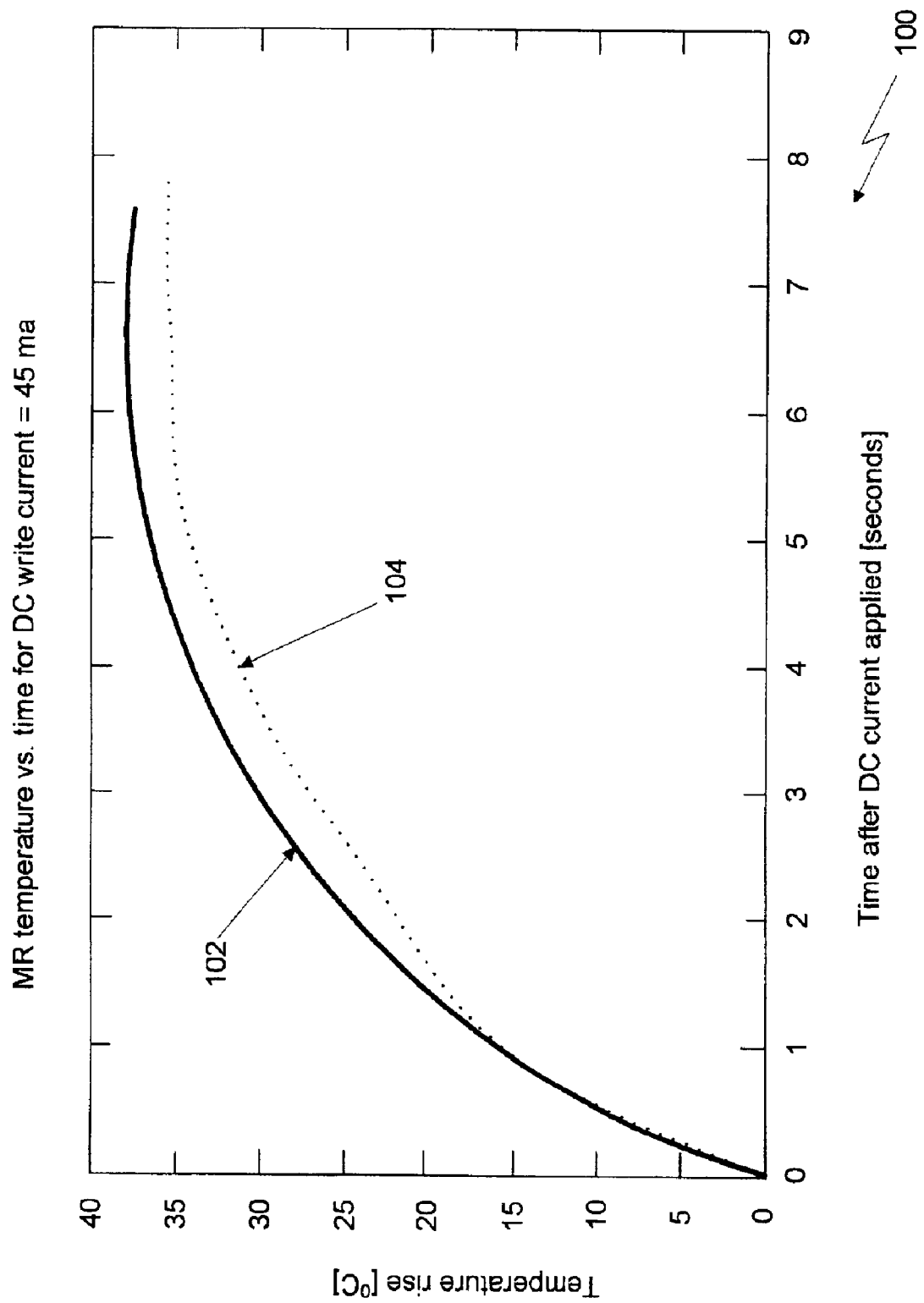
FIG. 6 is a graph illustrating Magnetoresistive (MR) temperature versus time for a disk drive, after applying current to the thin film inductive element of the disk drive.

FIG. 6 shows plots of the MR resistance versus time following the application of a 45E-3 amp current through the TF write element coil, shown generally at 100. The temperature rise in degrees Celsius is shown along the vertical axis, while the time lag after applying the DC current to coil 70 is shown along the horizontal axis. This data was normalized prior to plotting by subtracting the MR temperature at time 0 from all subsequent values. As previously illustrated in FIG. 3, when a foreign material such as an oily lubricant is present on the slider trailing edge, the heat energy from the thin film coil must raise the temperature of the lubricant as well as raise the temperature of the slider material. The net effect is that the temperature rise of the MR is slower, as shown at curve 104, and it reaches a slightly lower temperature than if no lubricant is present, as shown at curve 102. The reduced steady-state temperature of the MR element when lube is present may be due to an increased surface area for heat transfer to the air and/or evaporative cooling of the lube.

Another experiment was performed in order to look at both heating and cooling of the slider trailing edge with and without lubricant. For this experiment, a small drop of lubricant was added to the rear edge of a slider near the trailing edge of the center rail. The drop size was about the same size as the thin film inductive write coil. The MR bias current was held constant at 3E-3 amps and the write current was set at 55E-3 amps.

Figure 7:
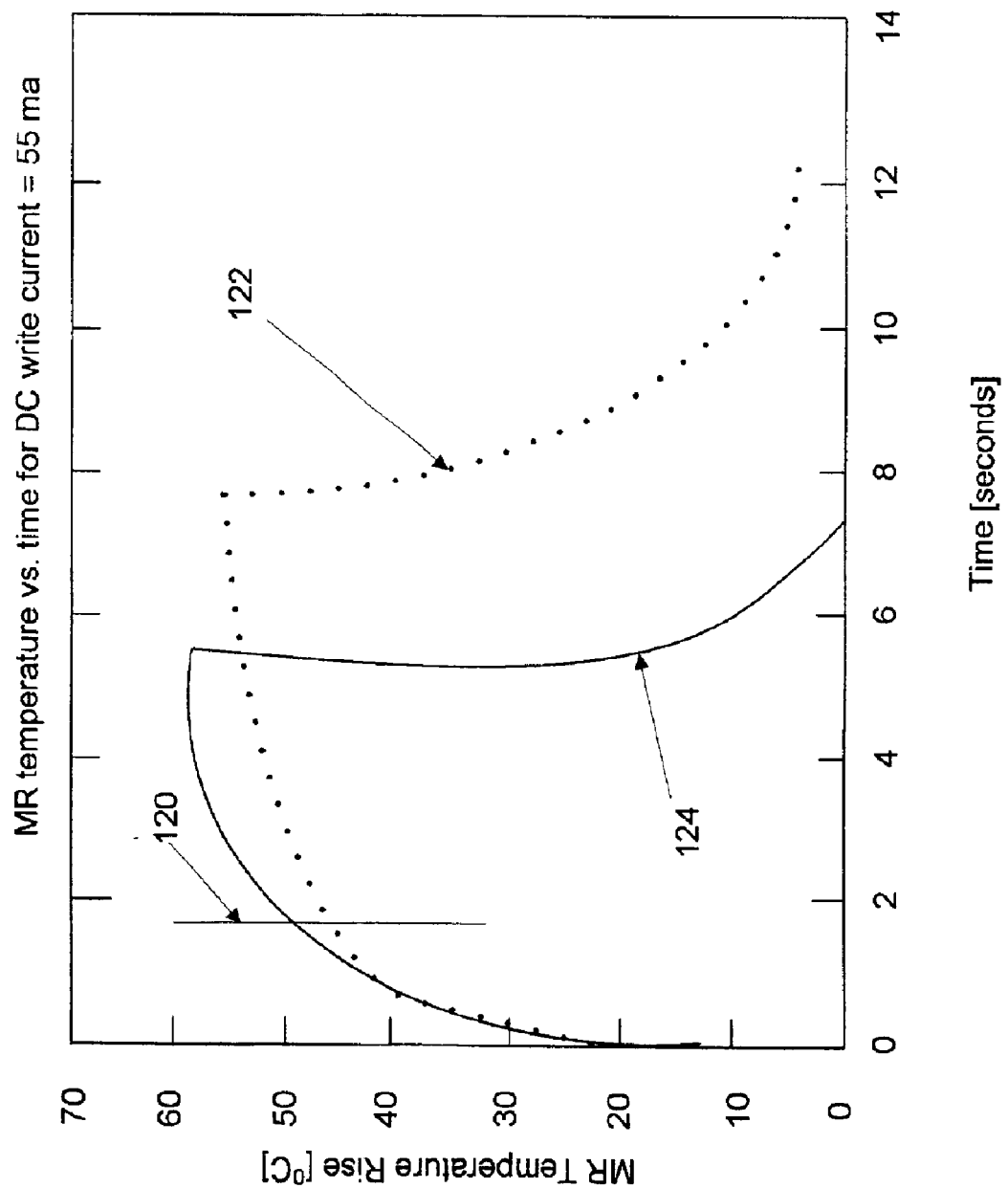
FIG. 7 is a graph illustrating MR temperature versus time, for both a dry slider (i.e., no lubricant) and a slider containing lubricant during a heating/cooling cycle.

In FIG. 7, the lubricant drop was added to the slider after the initial heating began (i.e., a drop of Z-dol lubricant was added approximately 2 seconds after the DC current was applied to the TF write coil), shown at 120. The effect of the added lubricant is dramatic in this case, as can be seen on curve 122. Note the sudden reduction in the rate of increasing temperature as measured by the MR head resistance. After reaching steady state with the thin film current on, the current was switched off. FIG. 7 also illustrates a heating and cooling curve for the slider without any added lubricant, shown generally at 124.

Figure 8:
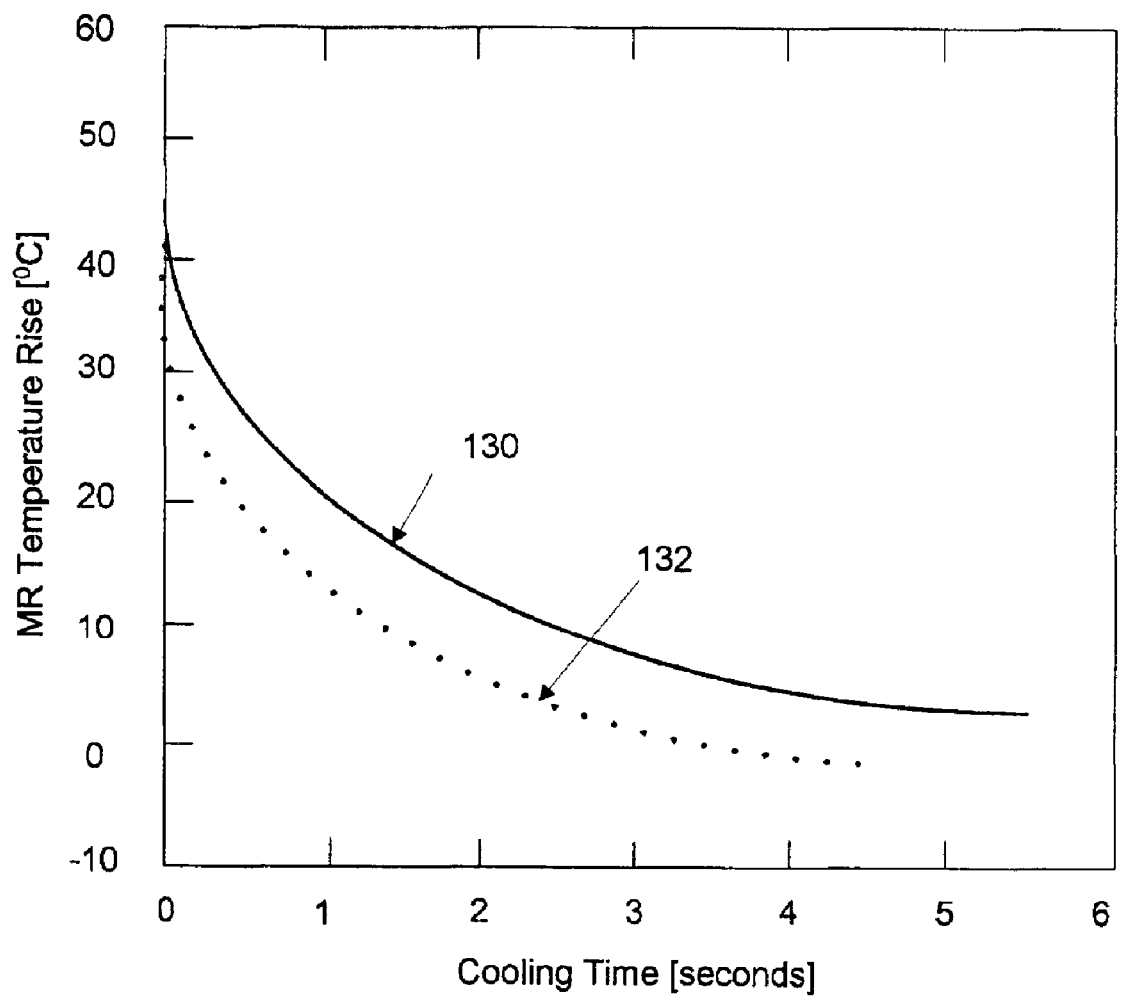
FIG. 8 is a graph illustrating MR temperature versus time, for both a dry slider (i.e., no lubricant) and a slider containing lubricant during the cooling portion of the cycle illustrated in FIG. 6.

FIG. 8 illustrates the cooling portion of the curves for both the lubricant 130 and no lubricant 132 cases. It is apparent that even during cooling, the additional lubricant reduces the rate of cooling owing to its thermal specific heat.

Additional modifications may be made to the illustrated embodiments without departing from the spirit or scope of the invention. Therefore, the invention lies in the claims hereinafter appended.

What is claimed is:

1. An apparatus for detecting contaminant accumulation on a slider in a disk drive, comprising:
    a data store for storing nominal resistance change values of a write element of the disk drive at manufacturing time;
    a coil associated with the write element, the coil positioned on the slider for measuring resistance change of the write element during disk drive operation; and
    a comparator for comparing the stored nominal resistance change values against the resistance change measurements performed during disk drive operation.

2. The apparatus of claim 1, wherein the stored nominal resistance change values include transient resistance.

3. The apparatus of claim 1, wherein the stored nominal resistance change values include the direct current (DC) resistance.

4. The apparatus of claim 1, wherein the data store is a reserved area on a disk surface of the disk drive.

5. The apparatus of claim 1, wherein the data store is a memory component present within the disk drive.

6. The apparatus of claim 1, wherein the coil is a planarized electrical structure.

7. The apparatus of claim 6, wherein the coil has a DC resistance of approximately 12 ohms.

8. The apparatus of claim 1, wherein the measurement of the resistance of the coil occurs when the write element is unloaded on a load/unload ramp of the disk drive.

9. The apparatus of claim 1, wherein the measurement of the resistance of the coil occurs while the write element of the disk drive is flying over areas of the disk drive surface that do not contain customer data.

10. The apparatus of claim 1, wherein the measurement of the resistance of the coil is initiated if the number of read/write errors detected during operation of the disk drive exceeds a predetermined threshold.

11. The apparatus of claim 1, wherein the measurement of the resistance of the coil is initiated periodically during the life of the disk drive.

12. The apparatus of claim 1, wherein the comparator resides within a hard disk controller processor of the disk drive.

13. A method for detecting contaminant accumulation on a slider in a disk drive comprising the steps of:
    storing resistance change values for a write element of a disk drive at the time of manufacture;
    measuring resistance change at a thin film coil associated with the write element during disk drive operation; and
    comparing the stored resistance change values against the measured resistance change for the write element.

14. The method of claim 13, wherein the method further comprises the step of:
    if the difference between the stored resistance change values and the measured resistance change exceeds a predetermined threshold, indicating that contamination accumulation on the slider is present.

15. The method of claim 13, wherein the method further comprises the step of:

if the difference between the stored resistance change values and the measured resistance change exceeds a predetermined threshold, recommending that the disk drive be replaced.

16. The method of claim 13, wherein the method further comprises the step of:

if the difference between the stored resistance change values and the measured resistance change exceeds a predetermined threshold, removing the contamination from the slider.

17. The method of claim 16, wherein the step of removing the contamination from the slider further comprises the steps of:

moving the write elements of the disk drive to an unloaded position; and volatizing the contaminant present on the slider by applying a steady DC current to the coil.

18. The method of claim 13, wherein the step of measuring the resistance change of a thin film coil associated with the write element further comprises the step of:

estimating the resistance of the thin film coil by monitoring the resistance of a giant magnetoresistive (GMR) element located in proximity to the write element.

19. The method of claim 13, wherein the step of measuring the resistance change of the thin film coil associated with the write element further comprises the step of:

measuring the resistance change of the thin film coil between electrical current pulses provided to the thin film coil.

20. The method of claim 19, wherein the step of measuring the resistance change of the thin film coil between electrical pulses provided to the thin film coil occurs while the write element are unloaded on a load/unload ramp of the disk drive.

21. The method of claim 19, wherein the step of measuring the resistance change of the thin film coil between electrical pulses provided to the thin film coil occurs while the write element is flying over non-customer data areas of the disk drive.

* * * * *